United States Patent
Nellutla

(10) Patent No.: US 10,409,359 B2
(45) Date of Patent: Sep. 10, 2019

(54) DYNAMIC BIN ORDERING FOR LOAD SYNCHRONIZATION

(71) Applicant: QUALCOMM Incorporated, San Diego, CA (US)

(72) Inventor: Aditya Nellutla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 15/873,368

(22) Filed: Jan. 17, 2018

(65) Prior Publication Data

US 2019/0221009 A1 Jul. 18, 2019

(51) Int. Cl.
*G06F 1/329* (2019.01)
*G05B 19/042* (2006.01)

(52) U.S. Cl.
CPC ......... *G06F 1/329* (2013.01); *G05B 19/0426* (2013.01); *G06T 2200/28* (2013.01); *G06T 2207/20021* (2013.01); *G09G 2330/021* (2013.01); *G09G 2360/08* (2013.01)

(58) Field of Classification Search
None
See application file for complete search history.

(56) References Cited

U.S. PATENT DOCUMENTS

| | | | | |
|---|---|---|---|---|
| 7,830,392 | B1 * | 11/2010 | Danskin | G06T 15/005 345/426 |
| 2013/0120380 | A1 * | 5/2013 | Kallio | G06T 15/005 345/421 |
| 2014/0245032 | A1 * | 8/2014 | Vadakkanmaruveedu | G06F 1/203 713/300 |
| 2018/0004510 | A1 * | 1/2018 | Grochowski | G06F 9/3001 |
| 2018/0089000 | A1 * | 3/2018 | Ryu | H04N 19/172 |
| 2018/0197271 | A1 * | 7/2018 | Broadhurst | G06T 15/005 |

OTHER PUBLICATIONS

Silpa, B. V. N., and Preeti Ranjan Panda. "Introducing energy efficiency into graphics processors." 2010 International Symposium on Electronic System Design. IEEE, 2010.*

* cited by examiner

*Primary Examiner* — Zhengxi Liu
(74) *Attorney, Agent, or Firm* — Holland & Hart LLP

(57) ABSTRACT

Generally, the described techniques provide for dividing a frame into bins and grouping the bins according to load information associated with the bins. For example, a device may divide a frame into a plurality of bins. The device may determine load information for each bin of the plurality of bins and order the plurality of bins, based on the load information for each bin, in a plurality of bin groups each associated with a power mode of the device. The device may then execute one or more rendering commands for each bin group of the plurality of groups at the power mode associated with the each bin group. By providing for bin-level granularity in power-mode allocation, the described techniques may improve rendering performance.

20 Claims, 11 Drawing Sheets

| Power Level | Frame 0 | Frame 1 | Frame 2 | Frame 3 | Frame 4 | Frame 5 | Frame 6 | Frame 7 |
|---|---|---|---|---|---|---|---|---|
| Turbo L1 | | | | | | | | |
| Turbo | | | | | | | | |
| Nom L1 | | | | | | | | |
| Nom | | | 5 ms | 5 ms | 5 ms | 5 ms | | |
| SVS L1 | | | | | | | | |
| SVS | 25 ms | 25 ms | | | | | | |
| Low SVS | | | | | | | 30 ms | 20 ms |
| Min SVS | | | | | | | | |

DYNAMIC BIN ORDERING FOR LOAD SYNCHRONIZATION

BACKGROUND

The following relates generally to rendering, and more specifically to dynamic bin ordering for load synchronization.

A device that provides content for visual presentation on an electronic display generally includes a graphics processing unit (GPU). The GPU in conjunction with other components renders pixels that are representative of the content on the display. That is, the GPU generates one or more pixel values for each pixel on the display and performs graphics processing on the pixel values for each pixel on the display to render each pixel for presentation.

For example, the GPU may convert two-dimensional or three-dimensional virtual objects into a two-dimensional pixel representation that may be displayed. Converting information about three-dimensional objects into a bitmap that can be displayed is known as pixel rendering and requires considerable memory and processing power. Three-dimensional graphics accelerators are becoming increasingly available in devices such as personal computers, smartphones, tablet computers, etc. Such devices may in some cases have constraints on computational power, memory capacity, and/or other parameters. Accordingly, three-dimensional graphics rendering techniques may present difficulties when being implemented on these devices. Improved rendering techniques may be desired.

SUMMARY

The described techniques relate to improved methods, systems, devices, or apparatuses that support dynamic bin ordering for load synchronization. Generally, the described techniques provide for bin-based rendering where the scene geometry in a frame is subdivided into bins or tiles, and the bins are grouped according to load information associated with the bins. For example, a device may leverage a visibility pass operation to determine load information per bin based on load estimation heuristics (e.g., a number of visible primitives in the bin). Load estimation may be computed in the visibility pass operation because all state and resource information may be known at this time. The device may then reorder bin processing by grouping bin commands within a set of constraints (e.g., the total time to process all bins of a given frame being within a threshold of a target, the total power consumption required to process all bins of the given frame being less than a threshold value, a combination thereof). The GPU may then process the commands per bin group at the indicated power level. The described techniques may thus improve rendering performance (e.g., by reducing power consumption without impacting the rendering quality). By providing for bin-level granularity in power-mode allocation of a GPU, a device may realize these benefits, among others.

A method of rendering is described. The method may include dividing a frame into a plurality of bins, determining load information for each bin of the plurality of bins, ordering the plurality of bins, based on the load information for each bin, in a plurality of bin groups each associated with a power mode of the device, and executing one or more rendering commands for each bin group of the plurality of groups at the power mode associated with the each bin group.

An apparatus for rendering is described. The apparatus may include means for dividing a frame into a plurality of bins, means for determining load information for each bin of the plurality of bins, means for ordering the plurality of bins, based on the load information for each bin, in a plurality of bin groups each associated with a power mode of the apparatus, and means for executing one or more rendering commands for each bin group of the plurality of groups at the power mode associated with the each bin group.

Another apparatus for rendering is described. The apparatus may include a processor, memory in electronic communication with the processor, and instructions stored in the memory. The instructions may be operable to cause the processor to divide a frame into a plurality of bins, determine load information for each bin of the plurality of bins, order the plurality of bins, based on the load information for each bin, in a plurality of bin groups each associated with a power mode of the apparatus, and execute one or more rendering commands for each bin group of the plurality of groups at the power mode associated with the each bin group.

A non-transitory computer-readable medium for rendering is described. The non-transitory computer-readable medium may include instructions operable to cause a processor to divide a frame into a plurality of bins, determine load information for each bin of the plurality of bins, order the plurality of bins, based on the load information for each bin, in a plurality of bin groups each associated with a power mode of a device, and execute one or more rendering commands for each bin group of the plurality of groups at the power mode associated with the each bin group.

Some examples of the method, apparatus, and non-transitory computer-readable medium described above may further include processes, features, means, or instructions for identifying a target processing time for the frame, wherein ordering the plurality of bins into the plurality of bin groups may be based at least in part on the target processing time.

Some examples of the method, apparatus, and non-transitory computer-readable medium described above may further include processes, features, means, or instructions for determining a total processing time for each bin group of the plurality of bin groups, wherein a sum of the total processing times for the plurality of bin groups may be within a threshold of the target processing time.

In some examples of the method, apparatus, and non-transitory computer-readable medium described above, determining the load information for each bin comprises determining a processing time for each power mode of the device or apparatus associated with each bin.

In some examples of the method, apparatus, and non-transitory computer-readable medium described above, determining, for each bin, the processing time for each power mode of the device or apparatus associated with each bin comprises determining a first processing time for a first power mode of the device or apparatus. Some examples of the method, apparatus, and non-transitory computer-readable medium described above may further include processes, features, means, or instructions for scaling the first processing time to determine a second processing time for a second power mode of the device or apparatus.

In some examples of the method, apparatus, and non-transitory computer-readable medium described above, scaling the first processing time comprises determining a ratio of a first operating frequency for the first power mode to a second operating frequency for the second power mode. Some examples of the method, apparatus, and non-transitory computer-readable medium described above may further include processes, features, means, or instructions for scaling the first processing time to determine the second processing time based at least in part on the ratio.

Some examples of the method, apparatus, and non-transitory computer-readable medium described above may further include processes, features, means, or instructions for estimating the load information for each bin of the plurality of bins based at least in part on a visibility pass operation for the frame.

Some examples of the method, apparatus, and non-transitory computer-readable medium described above may further include processes, features, means, or instructions for associating each bin of the plurality of bins with a respective bit indicating a presence of a non-occluded triangle within the each bin, wherein the load information for each bin may be based at least in part on the respective bit.

In some examples of the method, apparatus, and non-transitory computer-readable medium described above, ordering the plurality of bins into the plurality of bin groups comprises ordering the rendering commands for each bin group based at least in part on a target processing time for the frame, a target power consumption for the frame, or both.

In some examples of the method, apparatus, and non-transitory computer-readable medium described above, executing the one or more rendering commands for each bin group of the plurality of bin groups comprises executing, at a first operating frequency of the device or apparatus, one or more rendering commands for each bin of a first bin group of the plurality of groups before executing, at a second operating frequency of the device or apparatus, any of the one or more rendering commands for each bin of a second bin group of the plurality of bin groups, wherein the first operating frequency may be different from the second operating frequency.

In some examples of the method, apparatus, and non-transitory computer-readable medium described above, a size of each bin of the plurality of bins, a number of bins of the plurality of bins, or both may be based at least in part on a size of an internal cache of the device or apparatus.

Some examples of the method, apparatus, and non-transitory computer-readable medium described above may further include processes, features, means, or instructions for receiving the frame from a software application being executed by the device or apparatus. Some examples of the method, apparatus, and non-transitory computer-readable medium described above may further include processes, features, means, or instructions for generating an instruction to write a result of the one or more rendering commands to display buffer for each bin of each bin group of the plurality of bin groups.

DETAILED DESCRIPTION

Figure 1:
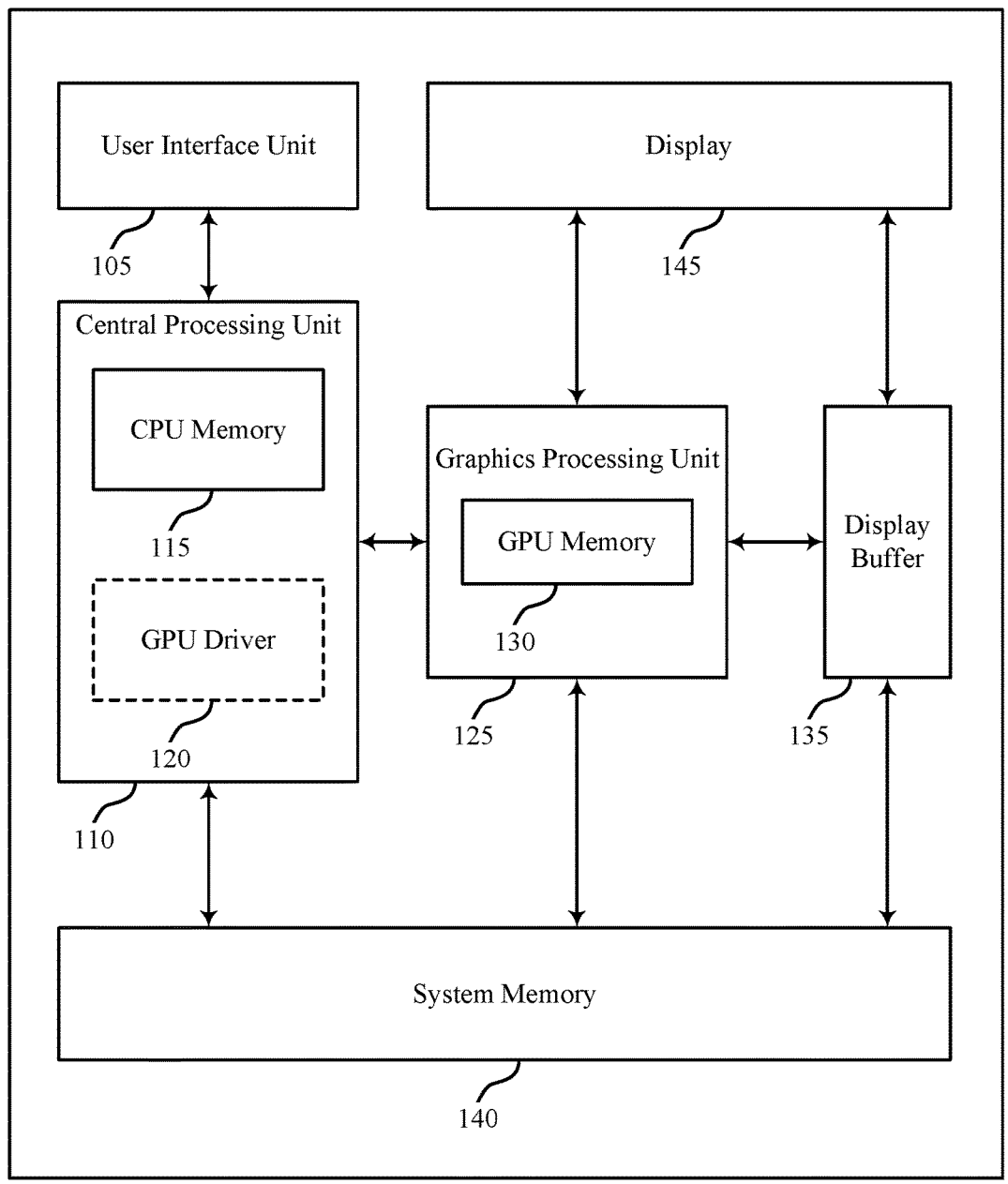
FIG. 1 illustrates an example of a device that supports dynamic bin ordering for load synchronization in accordance with aspects of the present disclosure.

Some GPU architectures may require a relatively large amount of data to be read from and written to system memory when rendering a frame of graphics data (e.g., an image). Mobile architectures (e.g., GPUs on mobile devices) may lack the memory bandwidth capacity required for processing entire frames of data. Accordingly, bin-based architectures may be utilized to divide an image into multiple bins (e.g., tiles). The tiles may be sized so that they can be processed using a relatively small amount (e.g., 256 kilobytes (kB)) of high bandwidth, on-chip graphics memory (which may be referred to as a cache, a GPU memory, or a graphics memory (GMEM) in aspects of the present disclosure). That is, the size of each bin may depend on or be limited by the size of the cache. The image may be reconstructed after processing each bin.

Bin rendering may thus be described with respect to a number of processing passes. For example, when performing bin-based rendering, a GPU may perform a binning pass and a plurality of rendering passes. With respect to the binning pass, the GPU may process an entire image and sort rasterized primitives (such as triangles) into bins. For example, the GPU may process a command stream for an entire image and assign the rasterized primitives of the image to bins.

In some examples, the GPU may generate one or more visibility streams during the binning pass (e.g., which may alternatively be referred to as a visibility pass operation herein). A visibility stream indicates the primitives that are visible in the final image and the primitives that are invisible in the final image. For example, a primitive may be invisible if it is obscured by one or more other primitives such that the primitive cannot be seen in the final reconstructed image. A visibility stream may be generated for an entire image, or may be generated on a per bin basis (e.g., one visibility stream for each bin). Generally, a visibility stream may include a series of bits, with each "1" or "0" being associated with a particular primitive. Each "1" may, for example, indicate that the primitive is visible in the final image, while each "0" may indicate that the primitive is invisible in the final image. In some cases, the visibility stream may control the rendering pass. For example, the visibility stream may be used to forego the rendering of invisible primitives. Accordingly, only the primitives that actually contribute to a bin (e.g., that are visible in the final image) are rendered and shaded, thereby reducing rendering and shading operations.

In other examples, the GPU may use a different process (e.g., other than or in addition to the visibility streams described above) to classify primitives as being located in a particular bin. In another example, a GPU may output a separate list per bin of "indices" that represent only the primitives that are present in a given bin. For example, the GPU may initially include all the primitives (e.g., vertices) in one data structure. The GPU may generate a set of pointers into the structure for each bin that only point to the primitives that are visible in each bin. Thus, certain pointers for visible indices may be included in a per-bin index list. Such pointers may serve a similar purpose as the visibility streams described above, with the pointers indicating which primitives (and pixels associated with the primitives) are included and visible in a particular bin.

A GPU may render graphics data using one or more render targets. In general, a render target may relate to a buffer in which the GPU draws pixels for an image being rendered. Creating a render target may involve reserving a particular region in memory for drawing. In some instances, an image may be composed of content from a plurality of render targets. For example, the GPU may render content to a number of render targets (e.g., offscreen rendering) and assemble the content to produce a final image (also referred to as a scene). Render targets may be associated with a number of commands. For example, a render target typically has a width (e.g., a horizontal dimension) and a height (e.g., a vertical dimension). A render target may also have a surface format, which describes how many bits are allocated to each pixel and how they are divided between red, green, blue, and alpha (e.g., or another color format). The contents of a render target may be modified by one or more rendering commands, such as commands associated with a fragment shader. In some examples, a render target or a frame may be divided in various bins or tiles. That is, a render target (e.g., a color buffer, a depth buffer, a texture) or a frame (e.g., the graphics data itself) may be divided into bins or tiles for processing.

In some cases, a GPU may have a dynamic voltage and frequency scaling (DVFS) algorithm to tune the voltage and frequency parameters of the GPU based on incoming packet information (e.g., packet loads). Based on certain information heuristics, the DVFS may set the GPU to one of a plurality of power modes. In some cases, this power mode selection may be referred to in the context of a device in which the GPU is embedded (e.g., or with which the GPU is interoperable). Thus, in aspects of the present disclosure, techniques describing selecting a power mode of a device may in some cases be understood to refer to selecting a power mode of a GPU associated with the device. Some algorithms typically wait a number of cycles (e.g., approximately 4-5 cycles) to analyze the average load across frames before switching the GPU to a different power mode. In scenarios in which the application load varies rapidly across or within frames, however, the DVFS may end up switching between different modes without yielding strong performance. More specifically, the DVFS may switch between multiple different modes in a non-deterministic fashion (e.g., based on heuristics from previous frames but without considering future processing load estimates), leading to inefficient resource and power management, which may be problematic, e.g., for devices with limited results. In accordance with aspects of the present disclosure, a GPU may leverage a visibility pass operation (and/or other operations) to determine load information per bin (e.g., based on a number of visible primitives within the bin) and adapt the DVFS for a given render target (e.g., or set of render targets) based on the load information and/or other information.

Aspects of the disclosure are initially described in the context of a computing device. Aspects of the disclosure are further illustrated by and described with reference to apparatus diagrams, system diagrams, and flowcharts that relate to dynamic bin ordering for load synchronization.

FIG. 1 illustrates an example of a device 100 in accordance with various aspects of the present disclosure. Examples of device 100 include, but are not limited to, wireless devices, mobile or cellular telephones, including smartphones, personal digital assistants (PDAs), video gaming consoles that include video displays, mobile video gaming devices, mobile video conferencing units, laptop computers, desktop computers, televisions set-top boxes, tablet computing devices, e-book readers, fixed or mobile media players, and the like.

In the example of FIG. 1, device 100 includes a central processing unit (CPU) 110 having CPU memory 115, a GPU 125 having GPU memory 130, a display 145, a display buffer 135 storing data associated with rendering, a user interface unit 105, and a system memory 140. For example, system memory 140 may store a GPU driver 120 (illustrated as being contained within CPU 110 as described below) having a compiler, a GPU program, a locally-compiled GPU program, and the like. User interface unit 105, CPU 110, GPU 125, system memory 140, and display 145 may communicate with each other (e.g., using a system bus).

Examples of CPU 110 include, but are not limited to, a digital signal processor (DSP), general purpose microprocessor, application specific integrated circuit (ASIC), field programmable logic array (FPGA), or other equivalent integrated or discrete logic circuitry. Although CPU 110 and GPU 125 are illustrated as separate units in the example of FIG. 1, in some examples, CPU 110 and GPU 125 may be integrated into a single unit. CPU 110 may execute one or more software applications. Examples of the applications may include operating systems, word processors, web browsers, e-mail applications, spreadsheets, video games, audio and/or video capture, playback or editing applications, or other such applications that initiate the generation of image data to be presented via display 145. As illustrated, CPU 110 may include CPU memory 115. For example, CPU memory 115 may represent on-chip storage or memory used in executing machine or object code. CPU memory 115 may include one or more volatile or non-volatile memories or storage devices, such as flash memory, a magnetic data media, an optical storage media, etc. CPU 110 may be able to read values from or write values to CPU memory 115 more quickly than reading values from or writing values to system memory 140, which may be accessed, e.g., over a system bus.

GPU 125 may represent one or more dedicated processors for performing graphical operations. That is, for example, GPU 125 may be a dedicated hardware unit having fixed function and programmable components for rendering graphics and executing GPU applications. GPU 125 may also include a DSP, a general purpose microprocessor, an ASIC, an FPGA, or other equivalent integrated or discrete logic circuitry. GPU 125 may be built with a highly-parallel structure that provides more efficient processing of complex graphic-related operations than CPU 110. For example, GPU 125 may include a plurality of processing elements that are configured to operate on multiple vertices or pixels in a parallel manner. The highly parallel nature of GPU 125 may allow GPU 125 to generate graphic images (e.g., graphical user interfaces and two-dimensional or three-dimensional graphics scenes) for display 145 more quickly than CPU 110.

GPU 125 may, in some instances, be integrated into a motherboard of device 100. In other instances, GPU 125 may be present on a graphics card that is installed in a port in the motherboard of device 100 or may be otherwise incorporated within a peripheral device configured to interoperate with device 100. As illustrated, GPU 125 may include GPU memory 130. For example, GPU memory 130 may represent on-chip storage or memory used in executing machine or object code. GPU memory 130 may include one or more volatile or non-volatile memories or storage devices, such as flash memory, a magnetic data media, an optical storage media, etc. GPU 125 may be able to read values from or write values to GPU memory 130 more quickly than reading values from or writing values to system memory 140, which may be accessed, e.g., over a system bus. That is, GPU 125 may read data from and write data to GPU memory 130 without using the system bus to access off-chip memory. This operation may allow GPU 125 to operate in a more efficient manner by reducing the need for GPU 125 to read and write data via the system bus, which may experience heavy bus traffic.

Display 145 represents a unit capable of displaying video, images, text or any other type of data for consumption by a viewer. Display 145 may include a liquid-crystal display (LCD), a light emitting diode (LED) display, an organic LED (OLED), an active-matrix OLED (AMOLED), or the like. Display buffer 135 represents a memory or storage device dedicated to storing data for presentation of imagery, such as computer-generated graphics, still images, video frames, or the like for display 145. Display buffer 135 may represent a two-dimensional buffer that includes a plurality of storage locations. The number of storage locations within display buffer 135 may, in some cases, generally correspond to the number of pixels to be displayed on display 145. For example, if display 145 is configured to include 640×480 pixels, display buffer 135 may include 640×480 storage locations storing pixel color and intensity information, such as red, green, and blue pixel values, or other color values. Display buffer 135 may store the final pixel values for each of the pixels processed by GPU 125. Display 145 may retrieve the final pixel values from display buffer 135 and display the final image based on the pixel values stored in display buffer 135.

User interface unit 105 represents a unit with which a user may interact with or otherwise interface to communicate with other units of device 100, such as CPU 110. Examples of user interface unit 105 include, but are not limited to, a trackball, a mouse, a keyboard, and other types of input devices. User interface unit 105 may also be, or include, a touch screen and the touch screen may be incorporated as part of display 145.

System memory 140 may comprise one or more computer-readable storage media. Examples of system memory 140 include, but are not limited to, a random access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor. System memory 140 may store program modules and/or instructions that are accessible for execution by CPU 110. Additionally, system memory 140 may store user applications and application surface data associated with the applications. System memory 140 may in some cases store information for use by and/or information generated by other components of device 100. For example, system memory 140 may act as a device memory for GPU 125 and may store data to be operated on by GPU 125 as well as data resulting from operations performed by GPU 125

In some examples, system memory 140 may include instructions that cause CPU 110 or GPU 125 to perform the functions ascribed to CPU 110 or GPU 125 in aspects of the present disclosure. System memory 140 may, in some examples, be considered as a non-transitory storage medium. The term "non-transitory" should not be interpreted to mean that system memory 140 is non-movable. As one example, system memory 140 may be removed from device 100 and moved to another device. As another example, a system memory substantially similar to system memory 140 may be inserted into device 100. In certain examples, a non-transitory storage medium may store data that can, over time, change (e.g., in RAM).

System memory 140 may store a GPU driver 120 and compiler, a GPU program, and a locally-compiled GPU program. The GPU driver 120 may represent a computer program or executable code that provides an interface to access GPU 125. CPU 110 may execute the GPU driver 120 or portions thereof to interface with GPU 125 and, for this reason, GPU driver 120 is shown in the example of FIG. 1 within CPU 110. GPU driver 120 may be accessible to programs or other executables executed by CPU 110, including the GPU program stored in system memory 140. Thus, when one of the software applications executing on CPU 110 requires graphics processing, CPU 110 may provide graphics commands and graphics data to GPU 125 for rendering to display 145 (e.g., via GPU driver 120).

The GPU program may include code written in a high level (HL) programming language, e.g., using an application programming interface (API). Examples of APIs include Open Graphics Library ("OpenGL"), DirectX, Render-Man, WebGL, or any other public or proprietary standard graphics API. The instructions may also conform to so-called heterogeneous computing libraries, such as Open-Computing Language ("OpenCL"), DirectCompute, etc. In general, an API includes a predetermined, standardized set of commands that are executed by associated hardware. API commands allow a user to instruct hardware components of a GPU 125 to execute commands without user knowledge as to the specifics of the hardware components. In order to process the graphics rendering instructions, CPU 110 may issue one or more rendering commands to GPU 125 (e.g., through GPU driver 120) to cause GPU 125 to perform some or all of the rendering of the graphics data. In some examples, the graphics data to be rendered may include a list of graphics primitives (e.g., points, lines, triangles, quadrilaterals, etc.).

The GPU program stored in system memory 140 may invoke or otherwise include one or more functions provided by GPU driver 120. CPU 110 generally executes the program in which the GPU program is embedded and, upon encountering the GPU program, passes the GPU program to GPU driver 120. CPU 110 executes GPU driver 120 in this context to process the GPU program. That is, for example, GPU driver 120 may process the GPU program by compiling the GPU program into object or machine code executable by GPU 125. This object code may be referred to as a locally-compiled GPU program. In some examples, a compiler associated with GPU driver 120 may operate in real-time or near-real-time to compile the GPU program during the execution of the program in which the GPU program is embedded. For example, the compiler generally represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, but not limited to, CPU 110 and GPU 125).

In the example of FIG. 1, the compiler may receive the GPU program from CPU 110 when executing HL code that includes the GPU program. That is, a software application being executed by CPU 110 may invoke GPU driver 120 (e.g., via a graphics API) to issue one or more commands to GPU 125 for rendering one or more graphics primitives into displayable graphics images. The compiler may compile the GPU program to generate the locally-compiled GPU program that conforms to a LL programming language. The compiler may then output the locally-compiled GPU program that includes the LL instructions. In some examples, the LL instructions may be provided to GPU 125 in the form a list of drawing primitives (e.g., triangles, rectangles, etc.).

The LL instructions (e.g., which may alternatively be referred to as primitive definitions) may include vertex specifications that specify one or more vertices associated with the primitives to be rendered. The vertex specifications may include positional coordinates for each vertex and, in some instances, other attributes associated with the vertex, such as color coordinates, normal vectors, and texture coordinates. The primitive definitions may include primitive type information, scaling information, rotation information, and the like. Based on the instructions issued by the software application (e.g., the program in which the GPU program is embedded), GPU driver 120 may formulate one or more commands that specify one or more operations for GPU 125 to perform in order to render the primitive. When GPU 125 receives a command from CPU 110, it may decode the command and configure one or more processing elements to perform the specified operation and may output the rendered data to display buffer 135.

GPU 125 generally receives the locally-compiled GPU program, and then, in some instances, GPU 125 renders one or more images and outputs the rendered images to display buffer 135. For example, GPU 125 may generate a number of primitives to be displayed at display 145. Primitives may include one or more of a line (including curves, splines, etc.), a point, a circle, an ellipse, a polygon (e.g., a triangle), or any other two-dimensional primitive. The term "primitive" may also refer to three-dimensional primitives, such as cubes, cylinders, sphere, cone, pyramid, torus, or the like. Generally, the term "primitive" refers to any basic geometric shape or element capable of being rendered by GPU 125 for display as an image (or frame in the context of video data) via display 145. GPU 125 may transform primitives and other attributes (e.g., that define a color, texture, lighting, camera configuration, or other aspect) of the primitives into a so-called "world space" by applying one or more model transforms (which may also be specified in the state data). Once transformed, GPU 125 may apply a view transform for the active camera (which again may also be specified in the state data defining the camera) to transform the coordinates of the primitives and lights into the camera or eye space. GPU 125 may also perform vertex shading to render the appearance of the primitives in view of any active lights. GPU 125 may perform vertex shading in one or more of the above model, world, or view space.

Once the primitives are shaded, GPU 125 may perform projections to project the image into a canonical view volume. After transforming the model from the eye space to the canonical view volume, GPU 125 may perform clipping to remove any primitives that do not at least partially reside within the canonical view volume. That is, GPU 125 may remove any primitives that are not within the frame of the camera. GPU 125 may then map the coordinates of the primitives from the view volume to the screen space, effectively reducing the three-dimensional coordinates of the primitives to the two-dimensional coordinates of the screen. Given the transformed and projected vertices defining the primitives with their associated shading data, GPU 125 may then rasterize the primitives. Generally, rasterization may refer to the task of taking an image described in a vector graphics format and converting it to a raster image (e.g., a pixelated image) for output on a video display or for storage in a bitmap file format.

In some examples, GPU 125 may implement tile-based rendering to render an image. For example, GPU 125 may implement a tile-based architecture that renders an image or rendering target by breaking the image into multiple portions, referred to as tiles or bins. The bins may be sized based on the size of GPU memory 130 (e.g., which may alternatively be referred to herein as GMEM or a cache). When implementing tile-based rendering, GPU 125 may perform a binning pass and one or more rendering passes. For example, with respect to the binning pass, GPU 125 may process an entire image and sort rasterized primitives into bins. GPU 125 may also generate one or more visibility streams during the binning pass, which visibility streams may be separated according to bin. For example, each bin may be assigned a corresponding portion of the visibility stream for the image. GPU driver 120 may access the visibility stream and generate command streams for rendering each bin. In aspects of the following, a binning pass may alternatively be referred to as a visibility stream operation.

With respect to each rendering pass, GPU 125 may perform a load operation, a rendering operation, and a store operation. During the load operation, GPU 125 may initialize GPU memory 130 for a new bin to be rendered. During the rendering operation, GPU 125 may render the bin and store the rendered bin to GPU memory 130. That is, GPU 125 may perform pixel shading and other operations to determine pixel values for each pixel of the tile and write the pixel values to GPU memory 130. During the store operation, GPU 125 may transfer the finished pixel values of the bin from GPU memory 130 to display buffer 135 (or system memory 140). After GPU 125 has rendered all of the bins associated with a frame (e.g., or a given rendering target) in this way, display buffer 135 may output the finished image to display 145.

GPU 125 may have a DVFS algorithm to tune its voltage and frequency parameters based on incoming packet loads. Based on certain information heuristics, the DVFS may set the GPU 125 to one of a plurality of power modes. As described further herein, GPU 125 may employ bin-based rendering in which a scene geometry in a frame is subdivided into bins (or tiles). In some cases, the division may be based on the resolution of display 145, the size of GPU memory 130, the color or Z precision of the render target, etc. During a binning pass, a visibility stream processor (e.g., a hardware component of GPU 125) may write out a compressed visibility stream that is used to cull back-facing or occluded triangles during the rendering passes. For example, the compressed visibility stream may keep track (internally) of a single bit per bin that indicates whether the bin contains any visible (e.g., non-occluded) triangles.

In accordance with the described techniques, based on load estimates obtained from the visibility pass (e.g., the binning pass), device 100 may associate meta-data with each bin indicating an estimated (e.g., averaged, calculated) time to process each bin under multiple power level mode of GPU 125. Based on the load estimates obtained from the visibility pass, CPU 110 (e.g., or GPU 125) may reorder the bin processing by grouping bin commands (e.g., based on or within one or more constraints).

As an example of one such constraint, grouping may be performed such that, for a given frame, the total time to process all bins should be within a threshold of a target duration. For example, when displaying frames via display 145 at a rate of sixty frames per second (60 fps), the total time to process all bins of a given frame may be constrained to be less than or equal to 16.66 milli-seconds (e.g., or within N milliseconds or some fraction thereof of the target time). Additionally or alternatively, grouping may be performed such that the total power consumption for processing all the bins is below a threshold (e.g., as small as possible) while still meeting the timing constraint and/or other constraints. Thus, the binning may be an example of an calculation problem under a timing constraint and a power-consumption constraint. Following bin grouping, CPU 110 (e.g., or GPU 125) may submit rendering commands for each bin group to GPU driver 120 by indicating power mode at which GPU 125 should operate for one or more given bin groups.

Figures 2A, 2B:
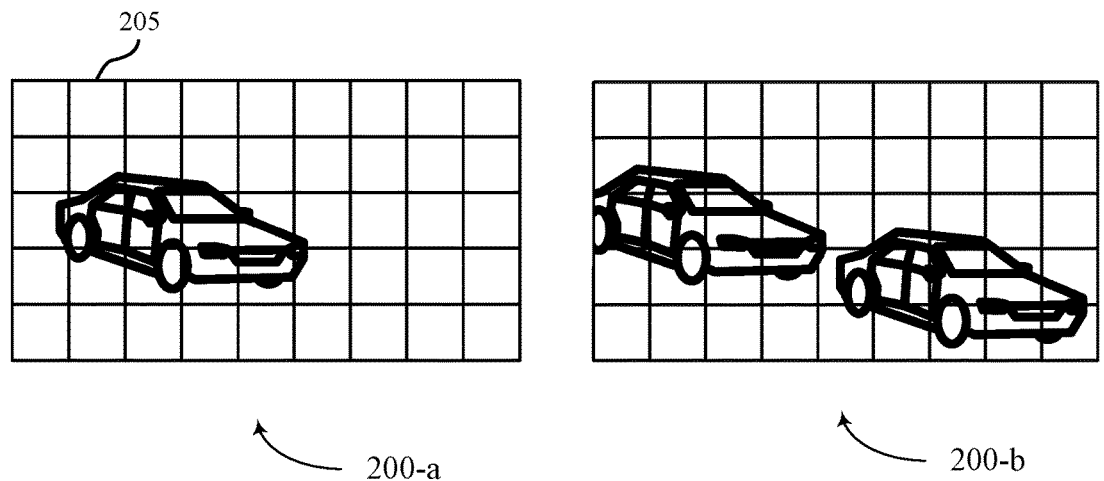
FIG. 2A illustrates example frames that support dynamic bin ordering for load synchronization in accordance with aspects of the present disclosure.
FIG. 2B illustrates a table that supports dynamic bin ordering for load synchronization in accordance with aspects of the present disclosure.

FIG. 2A illustrates example frames 200 that support dynamic bin ordering for load synchronization in accordance with various aspects of the present disclosure. For example, frame 200-a and 200-b may represent adjacent frames in a video stream. By way of example, frame 200-a and 200-b may be retrieved from a system memory (such as system memory 140) of a device or otherwise triggered by a software application being executed by a device (e.g., by a CPU of the device) and processed to be shown on a display (such as display 145). As illustrated, frame 200-a and 200-b may each be divided into a plurality of bins 205 for tile-based rendering. For example, graphics hardware that processes frames 200-a and 200-b may contain fast memory (e.g., GPU memory 130 described with reference to FIG. 1) that is of a size sufficient to hold a bin 205. As part of a single rendering pass for a particular portion of a frame 200, a GPU (such as GPU 125 described with reference to device 100) may render all or a subset of a batch of primitives with respect to a particular subset of the destination pixels (e.g., a particular bin of destination pixels) of the frame 200. After performing a first rendering pass with respect to a first bin 205, the GPU may store the rendered data in a display buffer and perform a second rendering pass with respect to a second bin 205, and so on. The GPU may incrementally traverse through the bins 205 until the primitives associated with every bin 205 have been rendered before displaying frame 200-a.

In some cases, however, an application load may be distributed across frames (e.g., or bins within a frame) such that a DVFS controlling the voltage and frequency parameters of the GPU may end up switching between different modes without yielding strong performance results. For example, frame 200-b may be associated with a larger load than frame 200-a (e.g., because a larger portion of bins 205 contain visible primitives to be rendered). Accordingly, a power mode that may be suitable for frame 200-a may not be suitable for frame 200-b (e.g., a power mode that may render frame 200-a within a target time, such as 16.66 ms, may not be operable to render frame 200-b within the target time). Such variations in application load may produce choppy image streams, unnecessarily consume energy (e.g., in the case that the power mode allows a frame 200 to be rendered in well under the target time), or otherwise negatively impact device performance.

FIG. 2B illustrates an example table 210. In table 210, the power levels are listed in decreasing order (e.g., Turbo L1 represents the highest power level and Min. SVS represents the lowest power level). These power levels are included for the sake of explanation and are not limiting of scope (e.g., some of the listed power levels may be omitted or other power levels may be possible without deviating from the scope of the present disclosure).

In this example, the DVFS algorithm determines an appropriate power level at an interval, which may be a fixed interval or a variable interval (e.g. every 50 ms, random duration, pseudo-random duration). Other periodicities may be employed, however, without deviating from the scope of the present disclosure and that the desired frame rate for the application is a first rate (e.g., 60 fps which is 16.66 ms per frame). In aspects of the following, the 16.66 ms duration may be referred to as the vertical synchronization (Vsync) duration.

In this example, frame 0 and frame 1 (e.g., which may resemble frames 200) may be cumulatively rendered in 50 ms. That is, the rendering of frames 0 and 1 may lag behind the Vsync rate for the application (which would expect two frames to be rendered in 33.33 ms). Accordingly, the DVFS algorithm may decide to increase the power level based on the determined higher frame load. Thus, frames 2, 3, 4, and 5 may be processed at the Nom power level.

In the example illustrated with respect to table 210, the device may essentially overcorrect for the increased load observed in frames 0 and 1. That is, the device may unnecessarily render each of frames 2, 3, 4, and 5 in 5 ms at the increased power level (e.g., such that the GPU may be idle for the remainder of the Vsync duration after rendering a given frame before beginning rendering a subsequent frame). Accordingly, in the next cycle, the DVFS may reduce the power level (e.g., to Low SVS level) which may be inadequate in the case of frames 6 and 7 (e.g., which may be associated increased demands requiring a higher load). Such non-deterministic behavior may be inefficient and lead to unnecessary power loss and less efficient performance. In accordance with the described techniques, a device may leverage hardware capabilities to pre-emptively estimate the load for a given number of frames (e.g., or set of bins) for improved power and performance-based results. For example, these load estimates may allow the device to determine an appropriate GPU power level for certain bins. Such bin-level power mode granularity (e.g., using Nom for a subset of bins of a frame, using SVS for a second subset of bins of the frame, etc.) may allow a device to dynamically adjust to different processing loads while minimizing unnecessary adjustments, which may in turn allow for improved performance (e.g., in terms of power consumption, in terms of rendering quality).

Figures 3A, 3B:
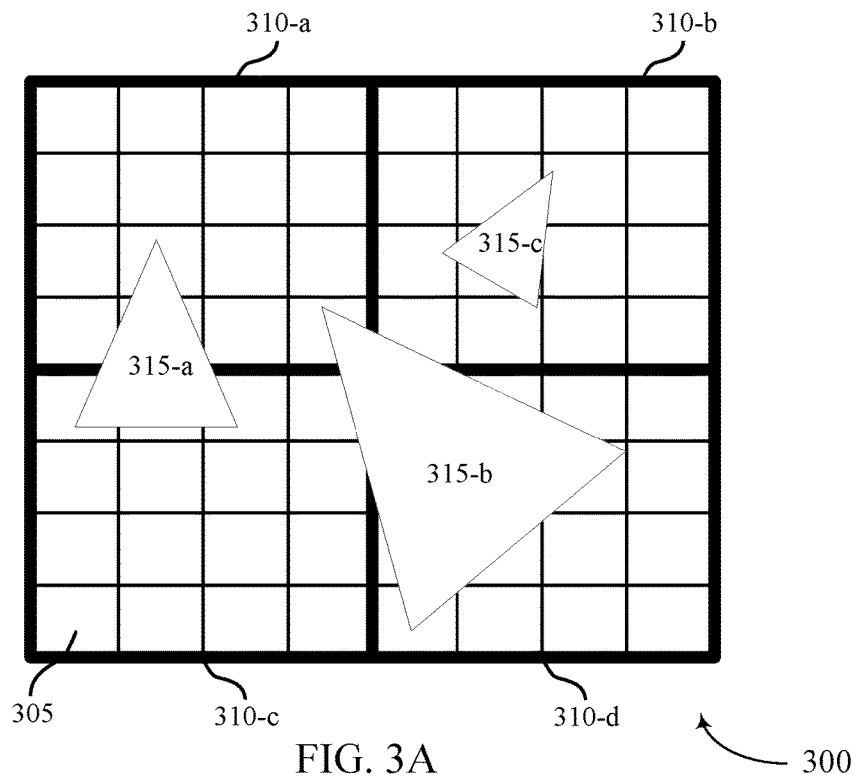
FIG. 3A illustrates an example of a binning layout that supports dynamic bin ordering for load synchronization in accordance with aspects of the present disclosure.
FIG. 3B illustrates a table that supports dynamic bin ordering for load synchronization in accordance with aspects of the present disclosure.

FIG. 3A illustrates an example of a binning layout 300 that supports dynamic bin ordering for load synchronization in accordance with various aspects of the present disclosure. Each bin 310 may be rendered/rasterized (e.g., by a GPU such as GPU 125) to contain multiple pixels 305, which pixels 305 may be shown via a display such as display 145. One or more primitives 315 may be visible in each bin 310. For example, portions of primitive 315-a may be visible in both bin 310-a and bin 310-c. Portions of primitive 315-b are visible in bin 310-a, bin 310-b, bin 310-c, and bin 310-d. Primitive 315-c is only visible in bin 310-b. During a rendering pass, all visible primitives 315 in a bin 310 may be rendered. For example, a visibility pass may be performed for each bin 310 (e.g., or for the frame as a whole during a binning pass) to determine load estimation information or to determine which primitives 315 are visible in the final rendered scene. The visibility pass may be performed by a GPU or by specialized hardware (e.g., a hardware accelerator), which may be referred to as a visibility stream processor. For example, some primitives 315 may be behind one or more other primitives 315 (e.g., may be occluded) and such occluded primitives 315 may not need to be rendered for a given bin 310.

For a given rendering pass, the pixel data for the bin 310 associated with that particular rendering pass may be stored in a GPU memory (e.g. GPU memory 130 described with reference to FIG. 1). After performing the rendering pass, the GPU may transfer the contents of the GPU memory to a display buffer. In some cases, the GPU may overwrite a portion of the data in the display buffer with the rendered data stored in the GPU memory. After transferring the contents of GPU memory to the display buffer, the GPU may initialize the GPU memory to default values and begin a subsequent rendering pass with respect to a different bin 310.

In accordance with the techniques described herein, during the rendering pass a visibility stream hardware block (e.g., which may be embedded within a GPU or otherwise interoperable with the GPU) may write out a visibility stream per bin 310, which visibility stream may be leveraged to determine load information per bin 310. An example is provided below in the context of a device with a GPU memory size (e.g., 1024 kB), and a display resolution (e.g., 1920×1080 pixels), which parameters may utilize a first number of bins (e.g., 16 bins) for rendering.

FIG. 3B illustrates an example table 320 that supports dynamic bin ordering for load synchronization in accordance with various aspects of the present disclosure. For the sake of explanation and understanding, the present example is described in the context of GPU power levels illustrated with respect to table 320. These examples, however, are not limiting of the scope or applicability of the present disclosure to different scenarios or examples.

The example illustrated with respect to table 320 ignores static power leakages and considers only dynamic power for simplicity of explanation, though these simplifying assumptions are not limiting of the scope and applicability of the present disclosure. As illustrated by table 320, a load estimate per bin 310 (in ms) may be determined using load estimation heuristics for different power levels. For example, a load for each bin 310 may be computed for a first power level (e.g., Nom) based on a number of visible primitives 315 in the bin 310 and/or other such load factors and the load may be scaled (e.g., linearly scaled) across to other power levels (e.g., based on a ratio of operating frequencies).

By way of example with reference to bin 0, a load estimate of 2.3 ms is determined for the Nom power level, and this estimate is scaled (e.g., to Nom L1) based on a ratio of the operating frequency of NomL1 (e.g., 560 MHz) to the operating frequency of Nom (e.g., 510 MHz). It is to be understood that other scaling factors (e.g., in addition to or instead of the operating frequency associated with the power mode) may be considered without deviating from the scope of the present disclosure. For example, in some cases the load estimate may be scaled based at least in part on a number of primitives 315 within a given bin 310.

Using a customary DVFS algorithm for this example, if a device uses any of the power modes below NomL1 for the given frame, the rendering of the frame will lag behind the Vsync rate (e.g., because the total time to render the frame will exceed 16.66 ms). Accordingly, efficiency of the rendering may be compromised. Further, the DVFS algorithm may have to wait a predetermined duration (e.g., 50 ms) or a predetermined number of Vsync cycles (e.g., 4 or 5 cycles) before adjusting the power level. Such non-deterministic scaling may not appropriately account for the varying loads of subsequent frames.

Alternatively, if the device operates at any of the power levels above NomL1, unnecessary power may be consumed because the GPU may render the frames faster than the Vsync rate and then remain idle for some time until beginning rendering for a subsequent frame. If the device operates at the NomL1 power level, the timing of the rendering may be well correlated with the Vsync rate. Even in this scenario, however, excess power may be consumed because the DVFS algorithm does not allow bin-level granularity of operation when scaling power levels. That is, some processing power may be conserved by processing one or more of the bins 310 at a lower power level without exceeding the Vsync rate for the frame. In each of these scenarios, the DVFS algorithms suffer from a lack of a means to deterministically estimate appropriate power levels for each bin 310 due to the unavailability of pre-determined load information and the unpredictability of the incoming packet load.

In accordance with the described techniques, a GPU may group bins 310 (e.g., such as the bins of table 320) into multiple sets based on one or more load estimates for each bin 310. That is, the GPU may identify bin groups which allow a given frame to be rendered within a target time while attempting to minimize the required processing power. For example, a first group associated with NomL1 may include Bin 1, Bin 2, Bin 3, Bin 5, Bin 9, Bin 11, and Bin 12 while a second group associated with Nom may include Bin 0, Bin 4, Bin 6, Bin 7, Bin 8, Bin 10, Bin 13. Each of the bins illustrated in table 320 may be an example of the bins 310 illustrated by and described with reference to FIG. 3A. Using a DVFS algorithm such as the ones described above in which all bins 310 are processed at NomL1, the average power consumed for sixty frames with identical loads to that of the frame described with reference to table 320 is 3,552, 347 units. By grouping the bins according to the described techniques, the average power consumed for sixty such frames is 3,268,646 units, which yields net power saving of 283,701 units per second (for 60 fps video streams). Additionally, the described grouping allows the bins of table 320 to be rendered within the desired duration (e.g., in 16.64 ms, which is nearly ideal with respect to the target 16.66 ms Vsync rate).

Variations on the example illustrated with respect to table 320 are specifically contemplated. For example, more than two groups of bins 310 may be identified. The grouping of bins 310 based on the load information may be an example of a complex calculation or determination, and the GPU may in some cases contain logic to train the bin grouping process and dictate this process over time for different frames, bins 310, etc. (e.g., whereby bin grouping for a current frame may be informed by grouping of a previous frame). Further, although techniques with respect to table 320 are described in the context of example static targets (e.g., the 16.66 ms Vsync rate), it is to be understood that the described techniques may be adapted to suit any target timing or power consumption metric, including dynamic targets and other examples.

Figure 4:
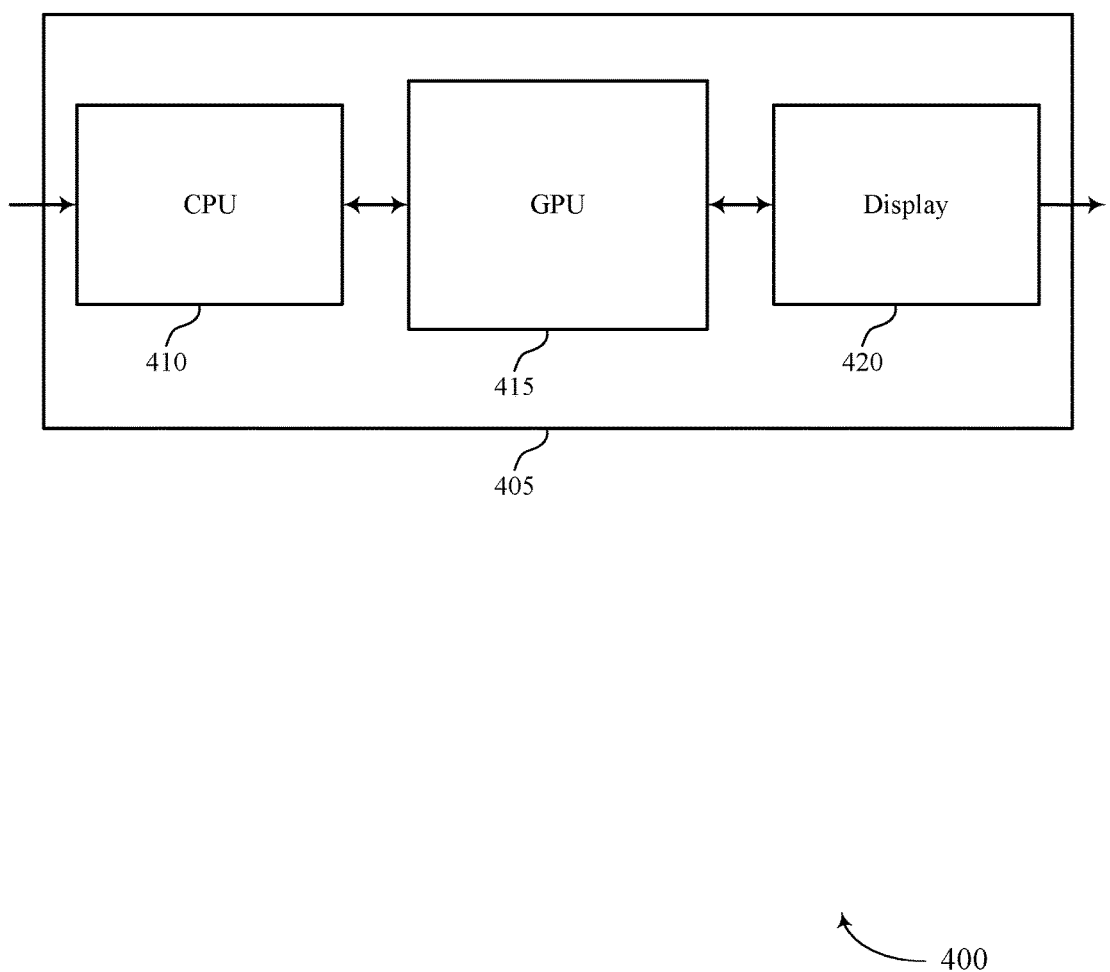
FIGS. 4 and 5 show block diagrams of a device that supports dynamic bin ordering for load synchronization in accordance with aspects of the present disclosure.

FIG. 4 shows a block diagram 400 of a device 405 that supports dynamic bin ordering for load synchronization in accordance with aspects of the present disclosure. Device 405 may be an example of aspects of a device 100 as described herein. Device 405 may include CPU 410, GPU 415, and display 420. Each of these components may be in communication with one another (e.g., via one or more buses).

CPU 410 may be an example of CPU 110 described with reference to FIG. 1. CPU 410 may execute one or more software applications, such as web browsers, graphical user interfaces, video games, or other applications involving graphics rendering for image depiction (e.g., via display 420). As described above, CPU 410 may encounter a GPU program (e.g., a program suited for handling by GPU 415) when executing the one or more software applications. Accordingly, CPU 410 may submit rendering commands to GPU 415 (e.g., via a GPU driver containing a compiler for parsing API-based commands).

GPU 415 may be an example of aspects of the GPU 715 described with reference to FIG. 7 or the GPU 125 described with reference to FIG. 1. GPU 415 and/or at least some of its various sub-components may be implemented in hardware, software executed by a processor, firmware, or any combination thereof. If implemented in software executed by a processor, the functions of the GPU 415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

GPU 415 and/or at least some of its various sub-components may be physically located at various positions, including being distributed such that portions of functions are implemented at different physical locations by one or more physical devices. In some examples, GPU 415 and/or at least some of its various sub-components may be a separate and distinct component in accordance with various aspects of the present disclosure. In other examples, GPU 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

GPU 415 (e.g., or CPU 410) may divide a frame into a set of bins. GPU 415 may determine load information for each bin of the set of bins. GPU 415 may order the set of bins, based on the load information for each bin, in a set of bin groups each associated with a power mode of the device. GPU 415 may execute one or more rendering commands for each bin group of the set of groups at the power mode associated with the each bin group.

Display 420 may display content generated by other components of the device. Display 420 may be an example of display 145 as described with reference to FIG. 1. In some examples, display 420 may be connected with a display buffer which stores rendered data until an image is ready to be displayed (e.g., as described with reference to FIG. 1).

Figure 5:
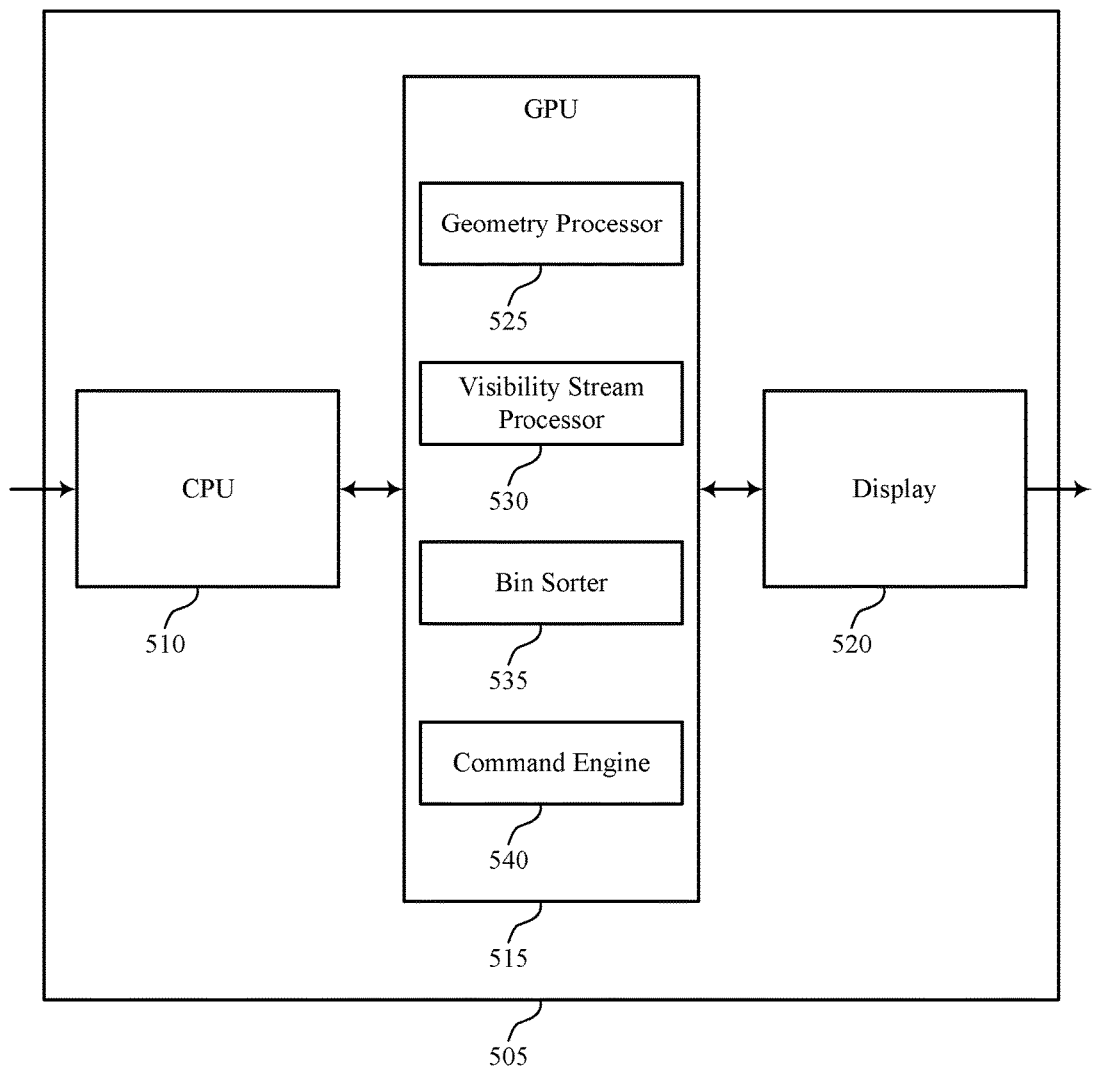

FIG. 5 shows a block diagram 500 of a device 505 that supports dynamic bin ordering for load synchronization in accordance with aspects of the present disclosure. Device 505 may be an example of aspects of a device 405 as described with reference to FIG. 4 or a device 100 as described with reference to FIG. 1. Device 505 may include CPU 510, GPU 515, and display 520. GPU 515 may also include geometry processor 525, visibility stream processor 530, bin sorter 535, and command engine 540. Each of these components may be in communication with one another (e.g., via one or more buses).

CPU 510 may be an example of CPU 110 described with reference to FIG. 1. CPU 510 may execute one or more software applications, such as web browsers, graphical user interfaces, video games, or other applications involving graphics rendering for image depiction (e.g., via display 520). As described above, CPU 510 may encounter a GPU program (e.g., a program suited for handling by GPU 515) when executing the one or more software applications. Accordingly, CPU 510 may submit rendering commands to GPU 515 (e.g., via a GPU driver containing a compiler for parsing API-based commands).

Geometry processor 525 may receive a frame from a software application being executed by device 505 (e.g., by CPU 510). Geometry processor 525 may divide the frame into a set of bins. In some cases, a size of each bin of the set of bins, a number of bins of the set of bins, or both are based on a size of an internal cache (e.g., a GPU memory as described with reference to FIG. 1) of device 505.

Visibility stream processor 530 may determine load information for at least some, if not each, of the bins of the set of bins (e.g., based on a visibility pass operation for the frame). For example, visibility stream processor 530 may determine load information for a subset of the bins with related results that can then be interpreted, extended, extrapolated, etc. to determine load information for the other bins or to proceed with other operations independent of determining load information for the other bins. In some cases, determining the load information for each bin includes determining a processing time for each power mode of the device associated with each bin. In some cases, determining, for each bin, the processing time for each power mode of the device associated with each bin includes determining a first processing time for a first power mode of the device.

In some cases, visibility stream processor 530 may scale the first processing time to determine a second processing time for a second power mode of the device. For example, visibility stream processor 530 may, determine a ratio of a first operating frequency for the first power mode to a second operating frequency for the second power mode and scale the first processing time to determine the second processing time based on the ratio. In some cases, visibility stream processor 530 may associate each bin of the set of bins with a respective bit indicating a presence of a non-occluded triangle within the each bin, where the load information for each bin is based on the respective bit.

Bin sorter 535 may order the set of bins, based on the load information for each bin, in a set of bin groups each associated with a power mode of the device. In some cases, ordering the set of bins into the set of bin groups includes ordering the rendering commands for each bin group based on a target processing time for the frame, a target power consumption for the frame, or both.

Command engine 540 may execute one or more rendering commands for each bin group of the set of groups at the power mode associated with the each bin group. In some cases, command engine 540 may generate an instruction to write a result of the one or more rendering commands to display buffer for each bin of each bin group of the set of bin groups. In some cases, executing the one or more rendering commands for each bin group of the set of bin groups includes executing, at a first operating frequency of the device, one or more rendering commands for each bin of a first bin group of the set of groups before executing, at a second operating frequency of the device, any of the one or more rendering commands for each bin of a second bin group of the set of bin groups, where the first operating frequency is different from the second operating frequency.

Display 520 may display content generated by other components of the device. Display 520 may be an example of display 145 as described with reference to FIG. 1. In some examples, display 520 may be connected with a display buffer which stores rendered data until an image is ready to be displayed (e.g., as described with reference to FIG. 1).

Figure 6:
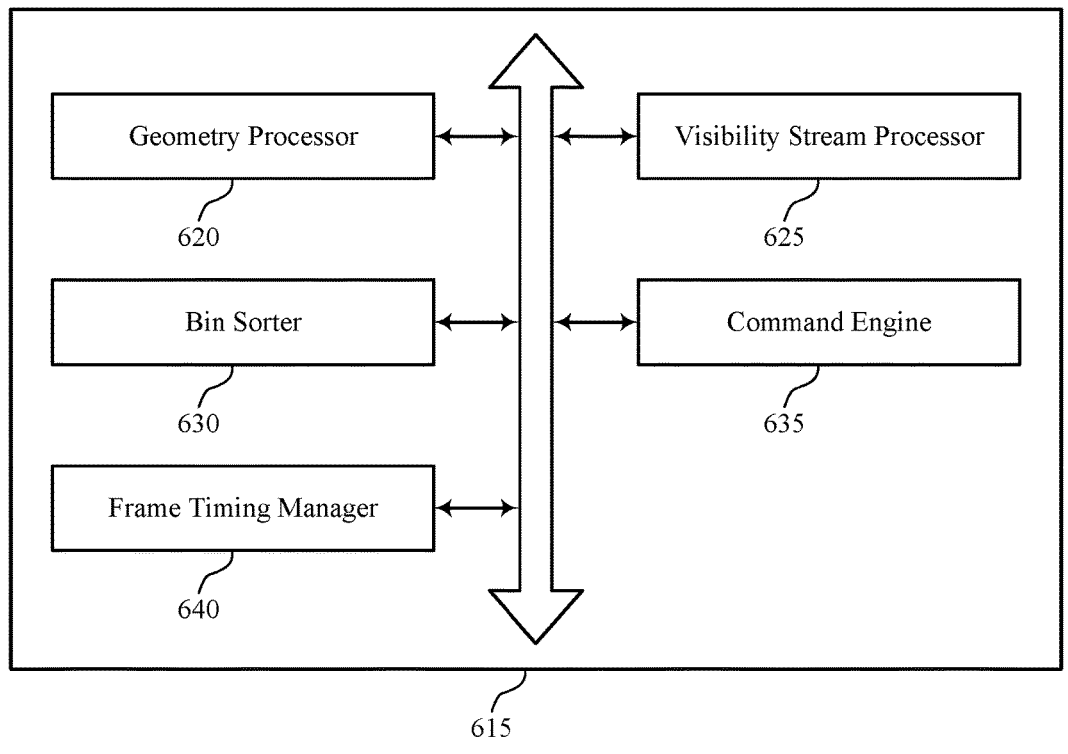
FIG. 6 illustrates a block diagram of a GPU that supports dynamic bin ordering for load synchronization in accordance with aspects of the present disclosure.

FIG. 6 shows a block diagram 600 of a GPU 615 that supports dynamic bin ordering for load synchronization in accordance with aspects of the present disclosure. The GPU 615 may be an example of aspects of a GPU 125, GPU 415, a GPU 515, or a GPU 715 described with reference to FIGS. 1, 4, 5, and 7. The GPU 615 may include geometry processor 620, visibility stream processor 625, bin sorter 630, command engine 635, and frame timing manager 640. Each of these modules may communicate, directly or indirectly, with one another (e.g., via one or more buses).

Geometry processor 620 may receive a frame from a software application being executed by the device. Geometry processor 620 may divide the frame into a set of bins. In some cases, a size of each bin of the set of bins, a number of bins of the set of bins, or both are based on a size of an internal cache (e.g., a GPU memory as described with reference to FIG. 1).

Visibility stream processor 625 may determine load information for each bin of the set of bins (e.g., based on a visibility pass operation for the frame). In some cases, determining the load information for each bin includes determining a processing time for each power mode of the device associated with each bin. In some cases, determining, for each bin, the processing time for each power mode of the device associated with each bin includes determining a first processing time for a first power mode of the device. In some cases, visibility stream processor 625 may scale the first processing time to determine a second processing time for a second power mode of the device. For example, visibility stream processor 625 may, determine a ratio of a first operating frequency for the first power mode to a second operating frequency for the second power mode and scale the first processing time to determine the second processing time based on the ratio. In some cases, visibility stream processor 625 may associate each bin of the set of bins with a respective bit indicating a presence of a non-occluded triangle within the each bin, where the load information for each bin is based on the respective bit.

Bin sorter 630 may order the set of bins, based on the load information for each bin, in a set of bin groups each associated with a power mode of the device. In some cases, ordering the set of bins into the set of bin groups includes ordering the rendering commands for each bin group based on a target processing time for the frame, a target power consumption for the frame, or both.

Command engine 635 may execute one or more rendering commands for each bin group of the set of groups at the power mode associated with the each bin group. In some cases, command engine 635 may generate an instruction to write a result of the one or more rendering commands to display buffer for each bin of each bin group of the set of bin groups. In some cases, executing the one or more rendering commands for each bin group of the set of bin groups includes executing, at a first operating frequency of the device, one or more rendering commands for each bin of a first bin group of the set of groups before executing, at a second operating frequency of the device, any of the one or more rendering commands for each bin of a second bin group of the set of bin groups, where the first operating frequency is different from the second operating frequency.

Frame timing manager 640 may identify a target processing time for the frame, where ordering the set of bins into the set of bin groups is based on the target processing time. Frame timing manager 640 may determine a total processing time for each bin group of the set of bin groups, where a sum of the total processing times for the set of bin groups is within a threshold of the target processing time.

Figure 7:
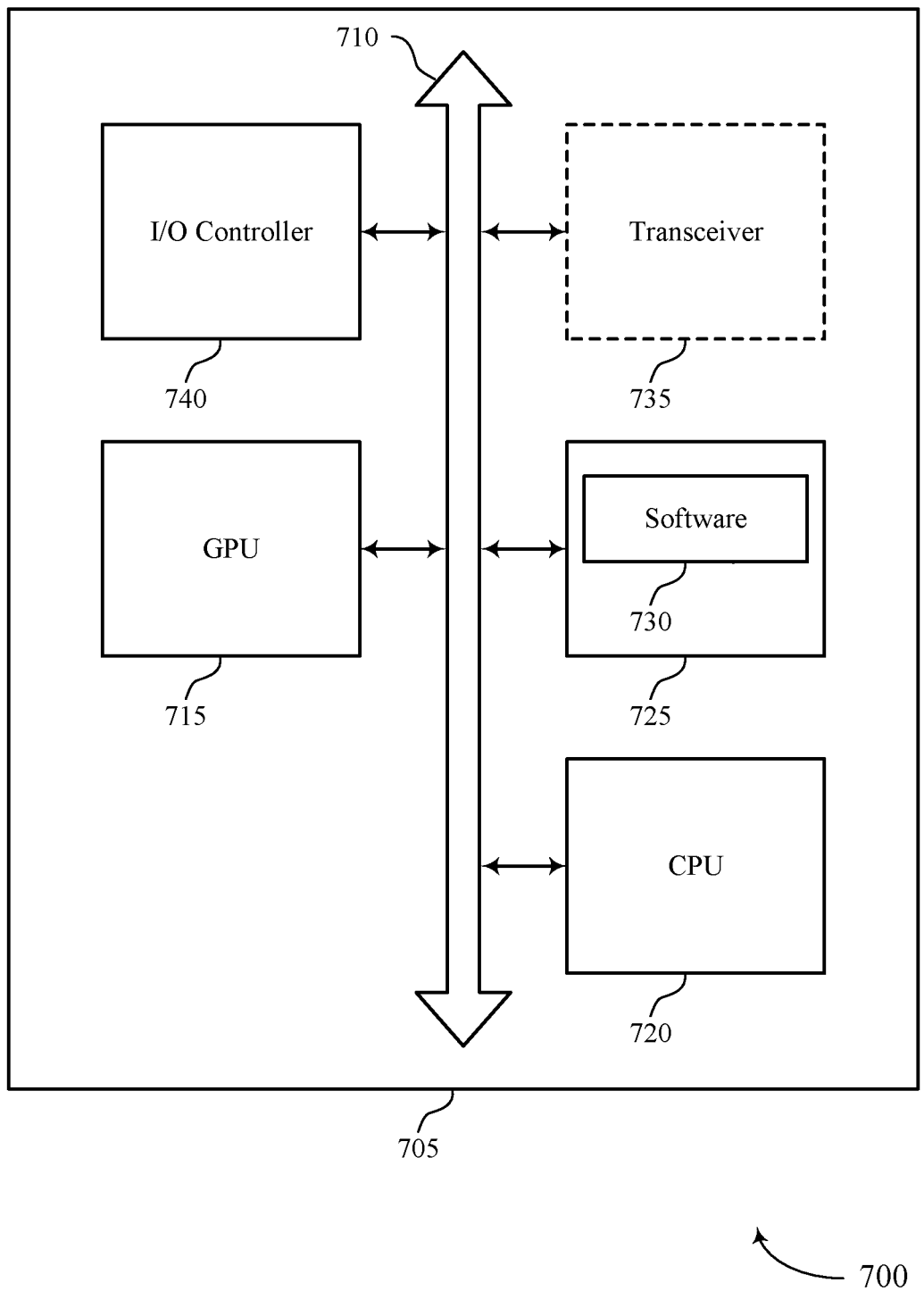
FIG. 7 illustrates a block diagram of a device that supports dynamic bin ordering for load synchronization in accordance with aspects of the present disclosure.

FIG. 7 shows a diagram of a system 700 including a device 705 that supports dynamic bin ordering for load synchronization in accordance with aspects of the present disclosure. Device 705 may be an example of or include the components of device 405, device 505, or a device 100 as described above, e.g., with reference to FIGS. 4 and 5. Device 705 may include components for bi-directional voice and data communications including components for transmitting and receiving communications, including GPU 715, CPU 720, memory 725, software 730, transceiver 735, and I/O controller 740. These components may be in electronic communication via one or more buses (e.g., bus 710).

CPU 720 may include an intelligent hardware device, (e.g., a general-purpose processor, a DSP, a microcontroller, an ASIC, an FPGA, a programmable logic device, a discrete gate or transistor logic component, a discrete hardware component, or any combination thereof). In some cases, CPU 720 may be configured to operate a memory array using a memory controller. In other cases, a memory controller may be integrated into CPU 720. CPU 720 may be configured to execute computer-readable instructions stored in a memory to perform various functions (e.g., functions or tasks supporting dynamic bin ordering for load synchronization).

Memory 725 may include RAM and/or ROM. The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support dynamic bin ordering for load synchronization. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may, in some examples, represent a wireless transceiver and may communicate bi-directionally with another wireless transceiver. The transceiver 735 may also include a modem to modulate the packets and provide the modulated packets to the antennas for transmission, and to demodulate packets received from the antennas.

I/O controller 740 may manage input and output signals for device 705. I/O controller 740 may also manage peripherals not integrated into device 705. In some cases, I/O controller 740 may represent a physical connection or port to an external peripheral. In some cases, I/O controller 740 may utilize an operating system such as iOS®, ANDROID®, MS-DOS®, MS-WINDOWS®, OS/2®, UNIX®, LINUX®, or another known operating system. In other cases, I/O controller 740 may represent or interact with a modem, a keyboard, a mouse, a touchscreen, or a similar device. In some cases, I/O controller 740 may be implemented as part of a processor. In some cases, a user may interact with device 705 via I/O controller 740 or via hardware components controlled by I/O controller 740. I/O controller 740 may in some cases represent or interact with a display.

Figure 8:
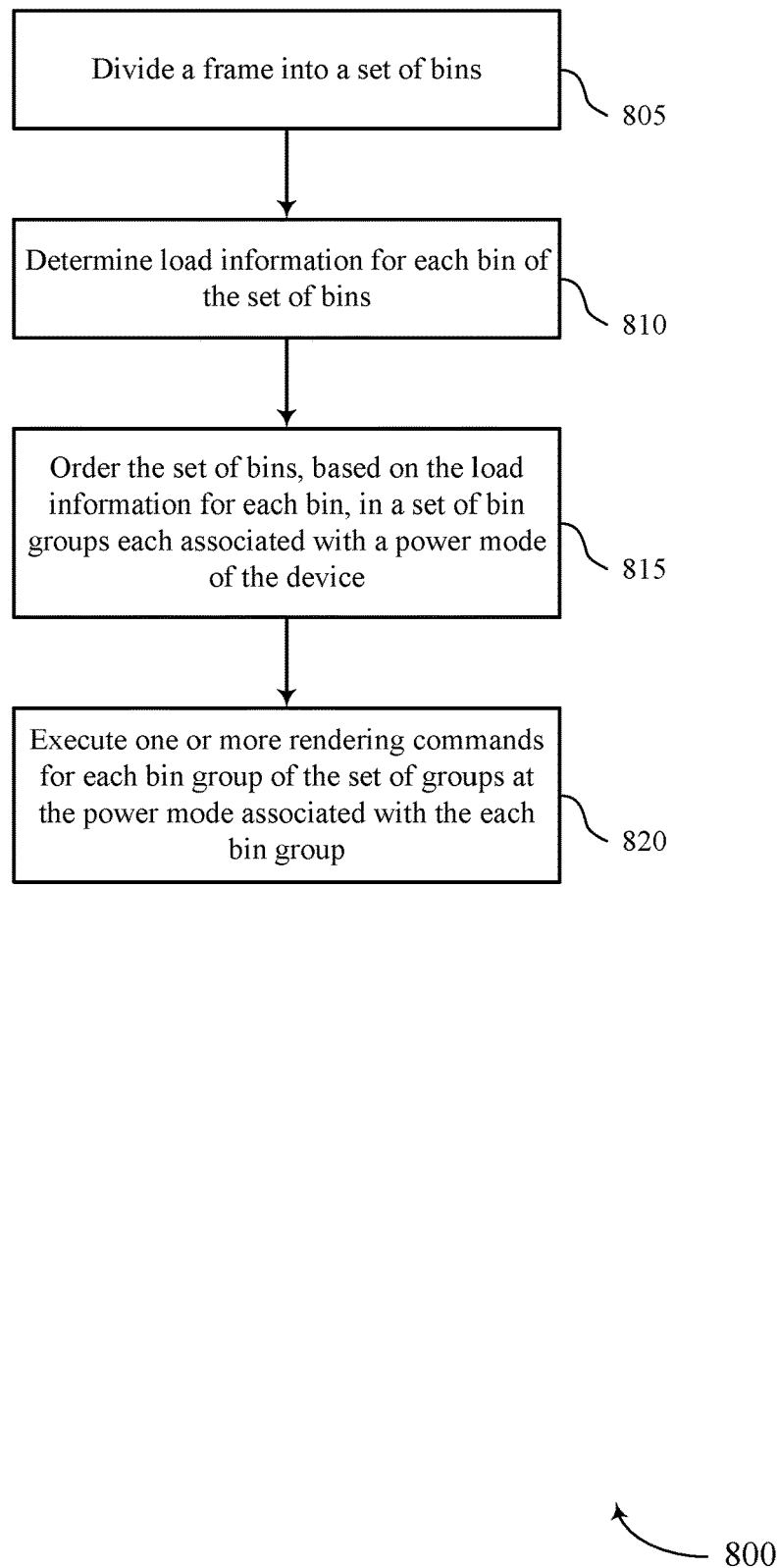
FIGS. 8 through 11 illustrate methods for dynamic bin ordering for load synchronization in accordance with aspects of the present disclosure.

FIG. 8 shows a flowchart illustrating a method 800 for dynamic bin ordering for load synchronization in accordance with aspects of the present disclosure. The operations of method 800 may be implemented by a device or its components as described herein. For example, the operations of method 800 may be performed by a GPU as described with reference to FIGS. 4 through 7. In some examples, a device may execute a set of codes to control the functional elements of the device to perform the functions described below. Additionally or alternatively, the device may perform aspects of the functions described below using special-purpose hardware.

At 805 the device may divide a frame into a plurality of bins. The operations of 805 may be performed according to the methods described herein. In certain examples, aspects of the operations of 805 may be performed by a geometry processor as described with reference to FIGS. 4 through 7.

At 810 the device may determine load information for each bin of the plurality of bins. The operations of 810 may be performed according to the methods described herein. In certain examples, aspects of the operations of 810 may be performed by a visibility stream processor as described with reference to FIGS. 4 through 7.

At 815 the device may order the plurality of bins, based on the load information for each bin, in a plurality of bin groups each associated with a power mode of the device. The operations of 815 may be performed according to the methods described herein. In certain examples, aspects of the operations of 815 may be performed by a bin sorter as described with reference to FIGS. 4 through 7.

At 820 the device may execute one or more rendering commands for each bin group of the plurality of groups at the power mode associated with the each bin group. The operations of 820 may be performed according to the methods described herein. In certain examples, aspects of the operations of 820 may be performed by a command engine as described with reference to FIGS. 4 through 7.

Figure 9:
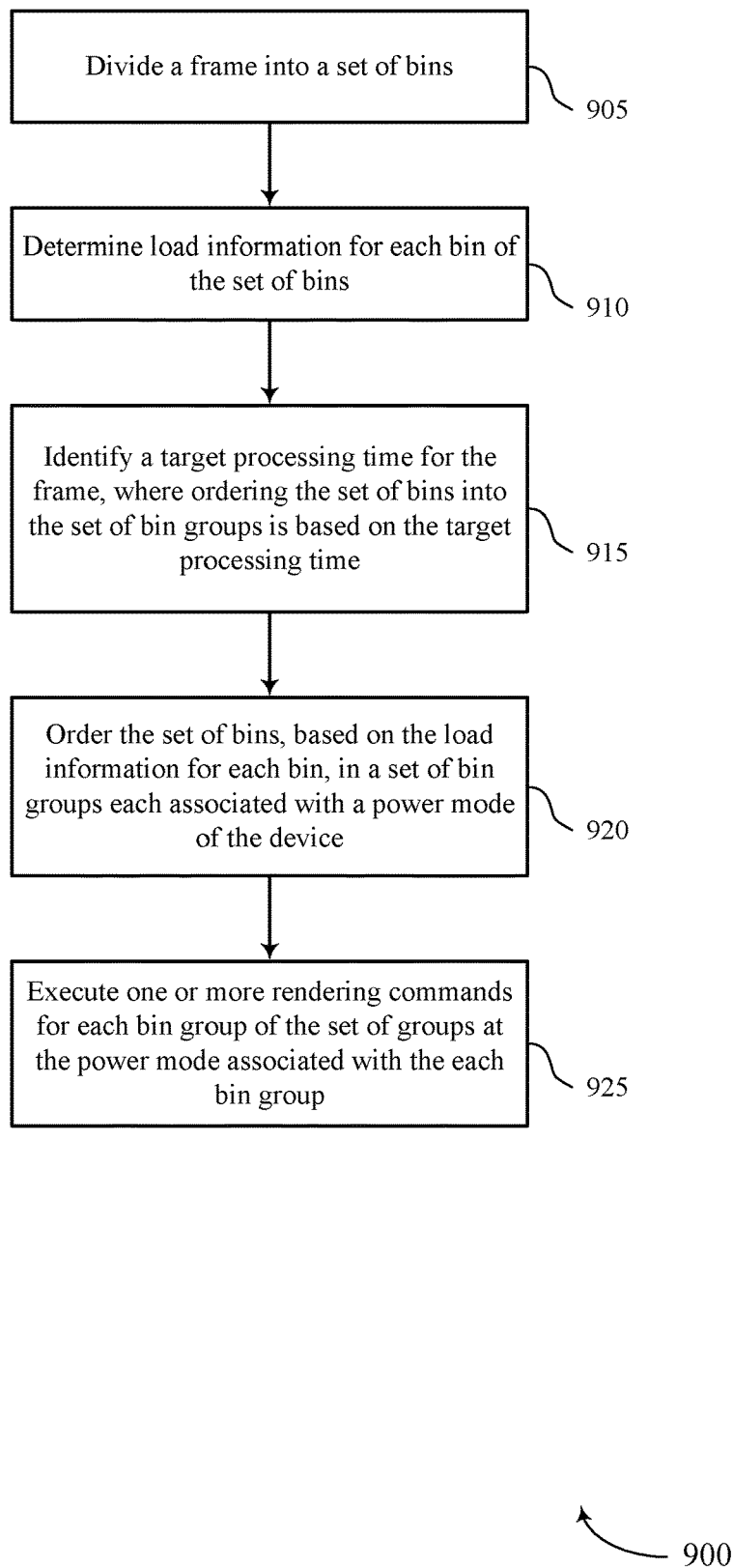

FIG. 9 shows a flowchart illustrating a method 900 for dynamic bin ordering for load synchronization in accordance with aspects of the present disclosure. The operations of method 900 may be implemented by a device or its components as described herein. For example, the operations of method 900 may be performed by a GPU as described with reference to FIGS. 4 through 7. In some examples, a device may execute a set of codes to control the functional elements of the device to perform the functions described below. Additionally or alternatively, the device may perform aspects of the functions described below using special-purpose hardware.

At 905 the device may divide a frame into a plurality of bins. The operations of 905 may be performed according to the methods described herein. In certain examples, aspects of the operations of 905 may be performed by a geometry processor as described with reference to FIGS. 4 through 7.

At 910 the device may determine load information for each bin of the plurality of bins. The operations of 910 may be performed according to the methods described herein. In certain examples, aspects of the operations of 910 may be performed by a visibility stream processor as described with reference to FIGS. 4 through 7.

At 915 the device may identify a target processing time for the frame, wherein ordering the plurality of bins into the plurality of bin groups is based at least in part on the target processing time. The operations of 915 may be performed according to the methods described herein. In certain examples, aspects of the operations of 915 may be performed by a frame timing manager as described with reference to FIGS. 4 through 7.

At 920 the device may order the plurality of bins, based on the load information for each bin, in a plurality of bin groups each associated with a power mode of the device. The operations of 920 may be performed according to the methods described herein. In certain examples, aspects of the operations of 920 may be performed by a bin sorter as described with reference to FIGS. 4 through 7.

At 925 the device may execute one or more rendering commands for each bin group of the plurality of groups at the power mode associated with the each bin group. The operations of 925 may be performed according to the methods described herein. In certain examples, aspects of the operations of 925 may be performed by a command engine as described with reference to FIGS. 4 through 7.

Figure 10:
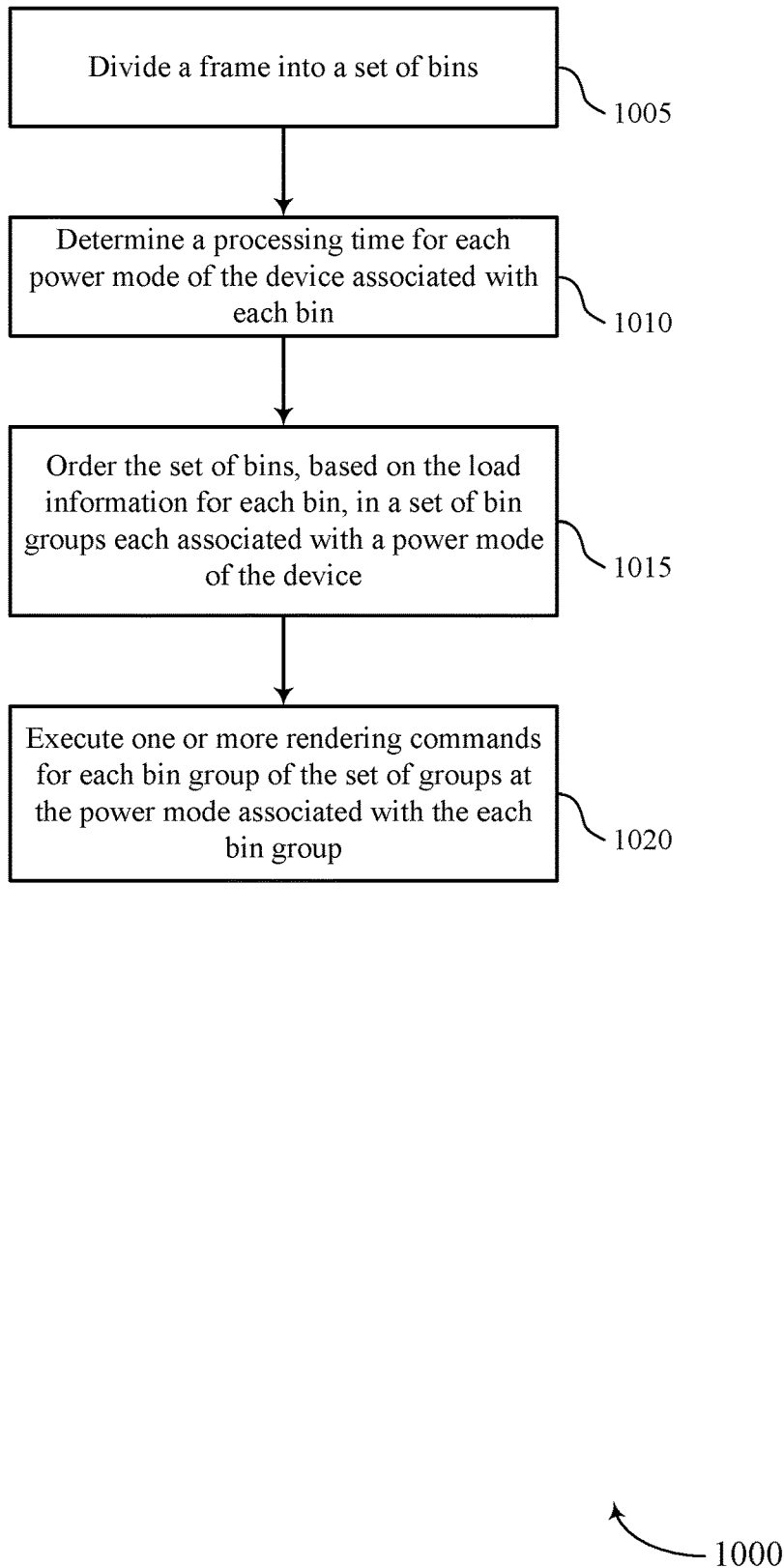

FIG. 10 shows a flowchart illustrating a method 1000 for dynamic bin ordering for load synchronization in accordance with aspects of the present disclosure. The operations of method 1000 may be implemented by a device or its components as described herein. For example, the operations of method 1000 may be performed by a GPU as described with reference to FIGS. 4 through 7. In some examples, a device may execute a set of codes to control the functional elements of the device to perform the functions described below. Additionally or alternatively, the device may perform aspects of the functions described below using special-purpose hardware.

At 1005 the device may divide a frame into a plurality of bins. The operations of 1005 may be performed according to the methods described herein. In certain examples, aspects of the operations of 1005 may be performed by a geometry processor as described with reference to FIGS. 4 through 7.

At 1010 the device may determine a processing time for each power mode of the device associated with each bin. The operations of 1010 may be performed according to the methods described herein. In certain examples, aspects of the operations of 1010 may be performed by a visibility stream processor as described with reference to FIGS. 4 through 7.

At 1015 the device may order the plurality of bins, based on the load information for each bin, in a plurality of bin groups each associated with a power mode of the device. The operations of 1015 may be performed according to the methods described herein. In certain examples, aspects of the operations of 1015 may be performed by a bin sorter as described with reference to FIGS. 4 through 7.

At 1020 the device may execute one or more rendering commands for each bin group of the plurality of groups at the power mode associated with the each bin group. The operations of 1020 may be performed according to the methods described herein. In certain examples, aspects of the operations of 1020 may be performed by a command engine as described with reference to FIGS. 4 through 7.

Figure 11:
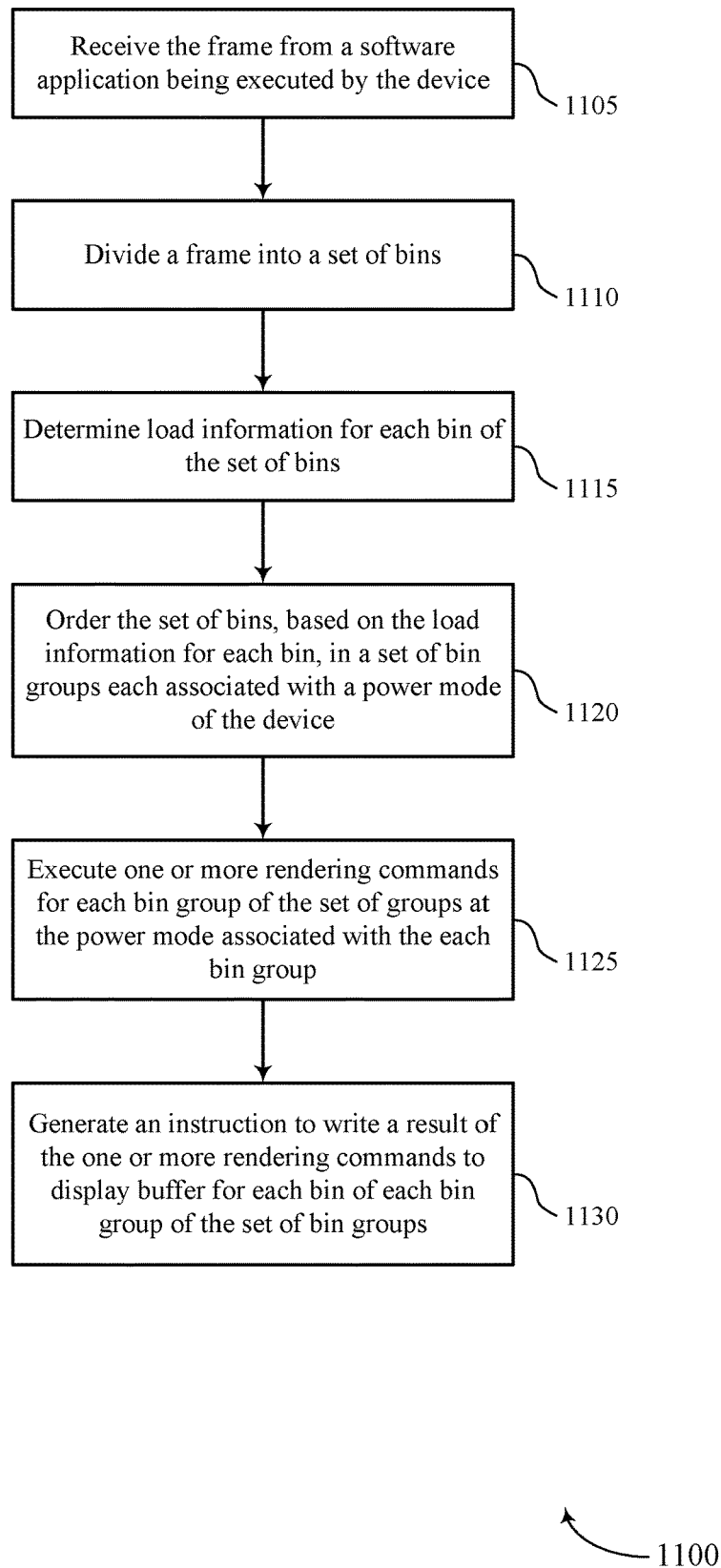

FIG. 11 shows a flowchart illustrating a method 1100 for dynamic bin ordering for load synchronization in accordance with aspects of the present disclosure. The operations of method 1100 may be implemented by a device or its components as described herein. For example, the operations of method 1100 may be performed by a GPU as described with reference to FIGS. 4 through 7. In some examples, a device may execute a set of codes to control the functional elements of the device to perform the functions described below. Additionally or alternatively, the device may perform aspects of the functions described below using special-purpose hardware.

At 1105 the device may receive the frame from a software application being executed by the device. The operations of 1105 may be performed according to the methods described herein. In certain examples, aspects of the operations of 1105 may be performed by a geometry processor as described with reference to FIGS. 4 through 7.

At 1110 the device may divide a frame into a plurality of bins. The operations of 1110 may be performed according to the methods described herein. In certain examples, aspects of the operations of 1110 may be performed by a geometry processor as described with reference to FIGS. 4 through 7.

At 1115 the device may determine load information for each bin of the plurality of bins. The operations of 1115 may be performed according to the methods described herein. In certain examples, aspects of the operations of 1115 may be performed by a visibility stream processor as described with reference to FIGS. 4 through 7.

At 1120 the device may order the plurality of bins, based on the load information for each bin, in a plurality of bin groups each associated with a power mode of the device. The operations of 1120 may be performed according to the methods described herein. In certain examples, aspects of the operations of 1120 may be performed by a bin sorter as described with reference to FIGS. 4 through 7.

At 1125 the device may execute one or more rendering commands for each bin group of the plurality of groups at the power mode associated with the each bin group. The operations of 1125 may be performed according to the methods described herein. In certain examples, aspects of the operations of 1125 may be performed by a command engine as described with reference to FIGS. 4 through 7.

At 1130 the device may generate an instruction to write a result of the one or more rendering commands to display buffer for each bin of each bin group of the plurality of bin groups. The operations of 1130 may be performed according to the methods described herein. In certain examples, aspects of the operations of 1130 may be performed by a command engine as described with reference to FIGS. 4 through 7.

It should be noted that the methods described above describe possible implementations, and that the operations and the steps may be rearranged or otherwise modified and that other implementations are possible. Further, aspects from two or more of the methods may be combined.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for rendering, comprising:
   a processor;
   memory in electronic communication with the processor; and
   instructions stored in the memory and executable by the processor to cause the apparatus to:
   divide a frame into a plurality of bins;
   determine load information for each bin of the plurality of bins;
   order the plurality of bins, based on the load information for each bin, in a plurality of bin groups, wherein each bin group of the plurality of bin groups is associated with a respective power mode of the apparatus; and
   execute one or more rendering commands for the each bin group of the plurality of groups at the respective power mode associated with the each bin group.

2. The apparatus of claim 1, wherein the instructions are further executable by the processor to cause the apparatus to:
   identify a target processing time for the frame, wherein ordering the plurality of bins into the plurality of bin groups is based at least in part on the target processing time.

3. The apparatus of claim 2, wherein the instructions are further executable by the processor to cause the apparatus to:
   determine a total processing time for each bin group of the plurality of bin groups, wherein a sum of the total processing times for the plurality of bin groups is within a threshold of the target processing time.

4. The apparatus of claim 1, wherein the instructions to determine the load information for each bin are executable by the processor to cause the apparatus to:
   determine a processing time for each respective power mode of the apparatus associated, wherein ordering the plurality of bins is based at least in part on the processing time for each respective power mode.

5. The apparatus of claim 4, wherein the instructions to determine, for each bin, the processing time for each respective power mode of the apparatus are executable by the processor to cause the apparatus to:
   determine a first processing time for a first respective power mode of the apparatus; and
   scale the first processing time to determine a second processing time for a second respective power mode of the apparatus.

6. The apparatus of claim 5, wherein the instructions to scale the first processing time are executable by the processor to cause the apparatus to:
   determine a ratio of a first operating frequency for the first respective power mode to a second operating frequency for the second respective power mode; and
   scale the first processing time to determine the second processing time based at least in part on the ratio.

7. The apparatus of claim 1, wherein the instructions to order the plurality of bins into the plurality of bin groups are executable by the processor to cause the apparatus to:
   order the rendering commands for each bin group based at least in part on a target processing time for the frame, a target power consumption for the frame, or both.

8. The apparatus of claim 1, wherein the instructions to execute the one or more rendering commands for each bin group of the plurality of bin groups are executable by the processor to cause the apparatus to:
   execute, at a first operating frequency of the apparatus, one or more rendering commands for each bin of a first bin group of the plurality of groups before executing, at a second operating frequency of the apparatus, any of the one or more rendering commands for each bin of a second bin group of the plurality of bin groups, wherein the first operating frequency is different from the second operating frequency.

9. The apparatus of claim 1, wherein the instructions are further executable by the processor to cause the apparatus to:
   estimate the load information for each bin of the plurality of bins based at least in part on a visibility pass operation for the frame.

10. The apparatus of claim 9, wherein the instructions are further executable by the processor to cause the apparatus to:
    associate each bin of the plurality of bins with a respective bit indicating a presence of a non-occluded triangle within the each bin, wherein the load information for each bin is based at least in part on the respective bit.

11. The apparatus of claim 1, wherein a size of each bin of the plurality of bins, a number of bins of the plurality of bins, or both are based at least in part on a size of an internal cache of the apparatus.

12. The apparatus of claim 1, wherein the instructions are further executable by the processor to cause the apparatus to:
    receive the frame from a software application being executed by the apparatus; and
    generate an instruction to write a result of the one or more rendering commands to display buffer for each bin of each bin group of the plurality of bin groups.

13. A method for rendering using a device, comprising:
    dividing a frame into a plurality of bins;
    determining load information for each bin of the plurality of bins;
    ordering the plurality of bins, based on the load information for each bin, in a plurality of bin groups, wherein each bin group of the plurality of bin groups is associated with a respective power mode of the device; and
    executing one or more rendering commands for the each bin group of the plurality of groups at the respective power mode associated with the each bin group.

14. The method of claim 13, further comprising:
    identifying a target processing time for the frame, wherein ordering the plurality of bins into the plurality of bin groups is based at least in part on the target processing time.

15. The method of claim 14, further comprising:
    determining a total processing time for each bin group of the plurality of bin groups, wherein a sum of the total processing times for the plurality of bin groups is within a threshold of the target processing time.

16. The method of claim 13, wherein determining the load information for each bin comprises:
    determining a processing time for each respective power mode of the device, wherein ordering the plurality of bins is based at least in part on the processing time for each respective power mode.

17. The method of claim 16, wherein determining, for each bin, the processing time for each respective power mode of the device comprises:

determining a first processing time for a first respective power mode of the device; and scaling the first processing time to determine a second processing time for a second respective power mode of the device.

18. The method of claim 17, wherein scaling the first processing time comprises:

determining a ratio of a first operating frequency for the first respective power mode to a second operating frequency for the second respective power mode; and scaling the first processing time to determine the second processing time based at least in part on the ratio.

19. A non-transitory computer-readable medium storing code for rendering, the code comprising instructions executable by a processor to:

divide a frame into a plurality of bins;

determine load information for each bin of the plurality of bins;

order the plurality of bins, based on the load information for each bin, in a plurality of bin groups, wherein each bin group of the plurality of bin groups is associated with a respective power mode of a device; and execute one or more rendering commands for the each bin group of the plurality of groups at the respective power mode associated with the each bin group.

20. The non-transitory computer-readable medium of claim 19, wherein the instructions are further executable by the processor to:

identify a target processing time for the frame, wherein ordering the plurality of bins into the plurality of bin groups is based at least in part on the target processing time.

* * * * *